United States Patent
Lindkamp

(10) Patent No.: US 8,262,406 B2
(45) Date of Patent: Sep. 11, 2012

(54) CONNECTOR HOUSING WITH ANGLED STRAIN RELIEF ELEMENT

(75) Inventor: Marc Lindkamp, Luebbecke (DE)

(73) Assignee: Harting Electronics GmbH & Co. KG (DE)

( * ) Notice: Subject to any disclaimer, the term of this patent is extended or adjusted under 35 U.S.C. 154(b) by 149 days.

(21) Appl. No.: 12/908,760

(22) Filed: Oct. 20, 2010

(65) Prior Publication Data

US 2011/0117770 A1    May 19, 2011

(30) Foreign Application Priority Data

Nov. 14, 2009 (DE) .......................... 10 2009 053 364

(51) Int. Cl.
*H01R 13/58* (2006.01)
(52) U.S. Cl. ........................................ 439/470; 439/462
(58) Field of Classification Search .................. 439/470, 439/454, 456, 459, 461, 462, 583, 472
See application file for complete search history.

(56) References Cited

U.S. PATENT DOCUMENTS

| | | | | |
|---|---|---|---|---|
| 6,203,362 | B1* | 3/2001 | Tsuji | 439/470 |
| 6,284,973 | B1 | 9/2001 | Daoud | 174/65 |
| 6,409,532 | B2* | 6/2002 | Payson et al. | 439/320 |
| 7,938,674 | B2* | 5/2011 | Lindkamp et al. | 439/462 |
| 2011/0065309 | A1* | 3/2011 | Lindkamp et al. | 439/449 |

FOREIGN PATENT DOCUMENTS

DE    20 2007 008 980    1/2008

* cited by examiner

*Primary Examiner* — Hae Moon Hyeon
(74) *Attorney, Agent, or Firm* — Hayes Soloway P.C.

(57) ABSTRACT

A connector housing with an angled strain relief element is separably fixed thereon in different directions. The housing includes an insulating body with a square collar around an opening, wherein the collar features a peripheral recess with interlocking recesses. The angled strain relief element features a connection opening that is consistent with this opening, as well as a U-Shaped rail that surrounds the connection openings on three sides. The rail features interlocking tabs and interlocking hooks and can be completely inserted into the recess of the insulating body until it interlocks.

18 Claims, 4 Drawing Sheets

CONNECTOR HOUSING WITH ANGLED STRAIN RELIEF ELEMENT

BACKGROUND OF THE INVENTION

1. Field of the Invention

The invention pertains to a connector housing for clamping and curving an electric cable that is connected to a connector, wherein the connector housing consists of an insulating body and an angled strain relief element that can be separably fixed on the insulating body in different directions, and wherein the strain relief element features a receptacle sleeve that is provided with a thread and a pressure screw.

A device of this type is required for angling a cable connected to contact elements of a connector with the smallest curvature radius and the least mechanical stress possible. This is intended to maintain the curved region of the cable as small as possible, for example, for applications in switchgear cabinets.

2. Description of the Related Art

A few solution for the angled routing of cables are already known from the prior art.

DE 20 2007 008 980 U1 discloses an angular cable connecting module. An angled connecting part disclosed in this publication consists of two different sections that can be connected to one another by means of a clip mechanism. This causes the sections to be fixed on a connecting section and to also clamp the sheath of the cable in a strain-relieving fashion. The cable extends without a sheath and in a curved fashion in the angled protective connecting part. The angled connecting part can be turned relative to the connector before it is fixed thereon in order to take into account the angular circumstances of the on-site installation.

The disadvantage of this known arrangement can be seen in that the angled connecting part only has a relatively low stability to a twisting force, as well as to the tensile forces of the cable, namely also in the fixed state.

U.S. Pat. No. 6,284,973 discloses a strain relief for a cable that consists of a base with a tubular extension. The tubular extension features a plurality of flexible arms that can be constricted by screwing on a nut with a conical region in its interior.

In such a strain relief, it is disadvantageous that the cable clamp in known clamping systems can only absorb low tensile forces because the clamping arms point in the direction of the tensile force and therefore cannot exert significant clamping forces upon the cable.

SUMMARY OF THE INVENTION

The invention therefore is based on the objective of increasing the mechanical stability of a connector housing of the initially cited type such that the angled strain relief element can no longer be turned after it is fixed and furthermore also withstands high tensile forces of the cable.

This objective is attained in that a face side of the insulating body features an opening that is surrounded by a square collar, wherein the collar features a peripheral recess, in that a front side of the strain relief element features a connection opening that is consistent with the opening of the insulating body, as well as a rail that surrounds the connection opening on three sides and is open toward the fourth side, wherein the rail can be inserted into the recess of the collar on its open side in a form-fitting fashion, and in that the receptacle sleeve is arranged on a rear side of the strain relief element that faces away from the front side in an angled fashion and features at least one recess with a clamping element that is clear on three sides arranged therein.

The invention concerns a device that is required for connecting a cable that is curved and connected to contact elements of a connector on this connector, for protecting the cable from mechanical stresses, particularly in the non-sheathed and therefore particularly curved region, and for reducing the overall curvature region of the cable. In this context, the term "curvature region" refers to a region that begins with the mating face of the connector and ends at the region of the cable that essentially once again extends in a non-curved fashion.

The clamping element that is arranged in a recess of the receptacle sleeve and clear on three sides advantageously features a free end that points in the direction of the angling. On a surface that points radially outward, the clamping element furthermore features a thickening that forms a flattening, inclined surface toward the fixed end of the clamping element. The clamping element is pressed radially inward by screwing a pressure screw on the thread of the receptacle sleeve. In this case, it is particularly advantageous that the open end of the clamping element points in the direction of the angling because the cable is also inserted into the receptacle sleeve in the same direction during the installation of the connector. Due to this measure, the clamping element cannot be tilted and damaged during the insertion of the cable. In addition, the clamping element is directed opposite to the direction of the cable tension and therefore able to absorb particularly high tensile forces such that the non-sheathed region of the cable within the connector is protected particularly well.

One significant advantage attained with the invention can be seen in that the angled strain relief element has a high stability to a twisting force after it is fixed on the insulating body. In addition, the strain relief element can be fixed on the square collar of the insulating body in four different directions. This makes it possible to arrange the cable outlet in four different directions, wherein this is sufficient for most applications such as, for example, in a switchgear cabinet. The installation of the connector is significantly simplified in comparison with the prior art due to the ability to laterally insert the strain relief element into the insulating body.

The connector housing essentially consists of only a few parts such that the manufacture and the handling are simplified and an additional stabilizing effect is achieved.

Since the curvature of the electric cable is predominantly situated in the non-sheathed region within the connector, the cable also is not subjected to any significant mechanical stress. Even if the cable is additionally curved in its sheathed region outside the connector, the utilization of the angled strain relief element at least leads to a reduction of the curvature region.

To this end, it is advantageous to angle the strain relief element by 30° to 60°, particularly by 40° to 50°, preferably by 45° because this makes it possible to maintain the curvature region small for a majority of conventional applications.

Due to the ability of a lateral insertion with subsequent interlocking, this design is not only stable, but also particularly compact and spaced-saving because a small distance between the angling and the insulating body and therefore a very small curvature radius in the non-sheathed region of the cable can be realized for the installation.

It is furthermore particularly advantageous with respect to the stability of the connector housing if the latching element inserted into the insulating body is interlocked therein. To this end, the insulating body features interlocking recesses in the peripheral recess of its square collar and the rail of the strain relief element features corresponding interlocking tabs. It is also advantageous with respect to the stability of the interlock if additional interlocking hooks that interlock behind the recess in the inserted state are moulded onto the open ends of the rail.

The material and the geometry of the connector housing are advantageously adapted to one another with respect to its required deformability. This ensures that the connector housing has a sufficient strength for holding the strain relief element on the insulating body interlocked with the strain relief element with the desired stability. On the other hand, the structural shape and the material need to be a suitable for allowing frequent interlocking and unlocking processes without damaging the connector housing, particularly the rail of the strain relief element. This is ensured due to the fact that the deformations occurring during the interlocking and unlocking process are as small as possible and take place in an elastic region of the material.

In one advantageous additional development, an interlocking recess is provided on each side of the peripheral recess of the insulating body. Corresponding interlocking tabs that fit into these interlocking recesses in a form-fitting fashion are moulded onto the rail. These interlocking tabs engage into the interlocking recesses in the state, in which the strain relief element is completely inserted into the insulating body. It is advantageous to provide precisely two interlocking tabs that are centrally arranged on the two opposing sides of the essentially U-shaped rail. In addition, the four interlocking recesses are also arranged centrally on the sides of the square collar, namely in the recess thereof. Consequently, the strain relief element can be arranged on the insulating body in four different orientations.

In another advantageous additional development, the rail features interlocking hooks that are moulded onto its open ends. These interlocking hooks are provided for interlocking behind the peripheral recess in the completely inserted state in order to provide additional stability.

In one preferred embodiment, the receptacle sleeve of the strain relief element features precisely four recesses with one respective clamping element. The pressure screw essentially has the shape of a hollow cylinder and is provided with an internal thread in order to be screwed onto the receptacle sleeve. The rear side of the pressure screw is provided with an opening, through which the cable to be connected is routed.

In one practical embodiment, the outer surface of the pressure screw features integrally moulded projections or recesses, particularly several surface elements that either make it possible to better grip the screw manually or to attach a tool. In the first variation, an odd number of surface elements are provided on the outer surface of the pressure screw so as to prevent or at least complicate the attachment of an open-end wrench or the like and to thusly prevent such installation errors that can result in the application of an excessive force. In the second variation, an even number of surface elements is accordingly preferred such that two surfaces are always located opposite of one another and a corresponding tool can be utilized.

In another practical embodiment, the clamping elements at the inner end on the mating side are provided with additional means that allow a superior grip of the clamping element on the cable.

In one advantageous additional development, a seal is also provided on the strain relief element in order to prevent the admission of water and dirt.

In one advantageous embodiment, the connector housing features a coding element. In this case, the strain relief element features a corresponding receptacle, into which the coding element can be inserted. In this case, the coding element is color-coded and/or equipped with an RFID (Radio Frequency Identification) transponder. A rough allocation can be quickly and intuitively realized due to the color coding. The RFID coding has the advantage that a correspondingly large number of codings can be achieved and that a corresponding number of connections can be coded and allocated with the aid of a corresponding read feature of their source. This can be particularly useful, for example, in the allocation of individual cables of an extensive cable harness in fixed installations.

BRIEF DESCRIPTION OF THE DRAWINGS

One exemplary embodiment of the invention is illustrated in the drawings and described in greater detail below. In these drawings.

DESCRIPTION OF THE PREFERRED EMBODIMENTS

Figure 1A:
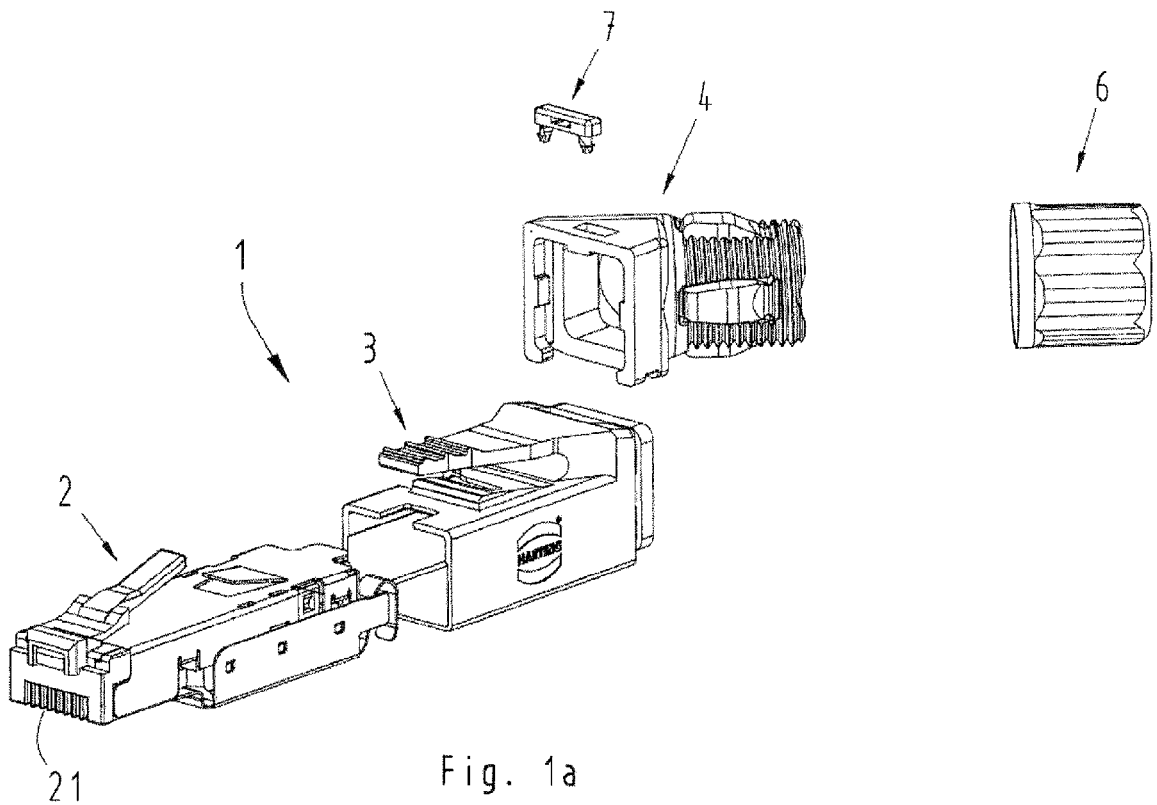
FIG. 1a shows an uninstalled connector.

FIG. 1a shows an uninstalled connector 1 that consists of a connector insert 2 and a connector housing. The connector housing comprises an insulating body 3, a strain relief element 4, a pressure screw 6 and a coding element 7. The connector insert 2 features a mating face 21.

Figure 1B:
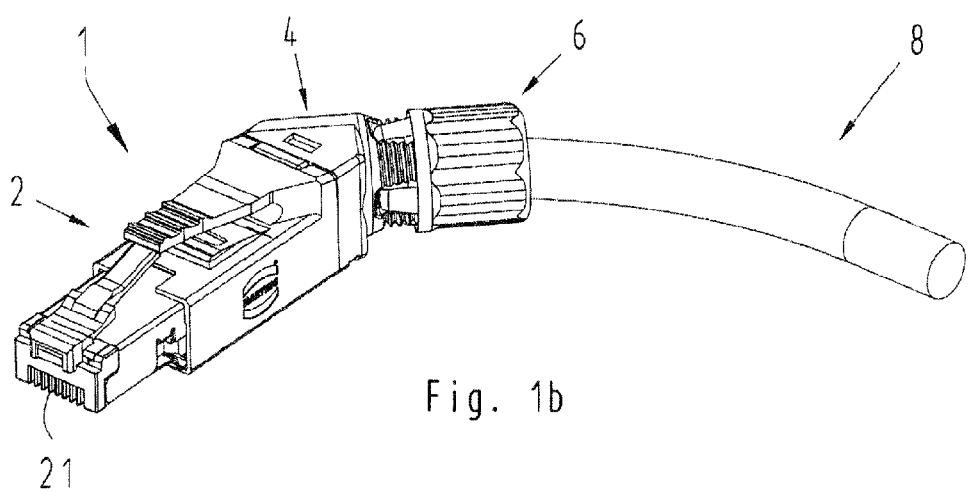
FIG. 1b shows an installed connector with cable.

FIG. 1b shows a mounted connector 1 with a pressure screw 6 screwed thereon and a cable 8 that is thusly fixed on the strain relief element 4. The region between the mating face 21 of the connector insert 2 and the region, in which the cable once again extends in a non-curved fashion, is referred to as the curvature region.

Figure 2A:
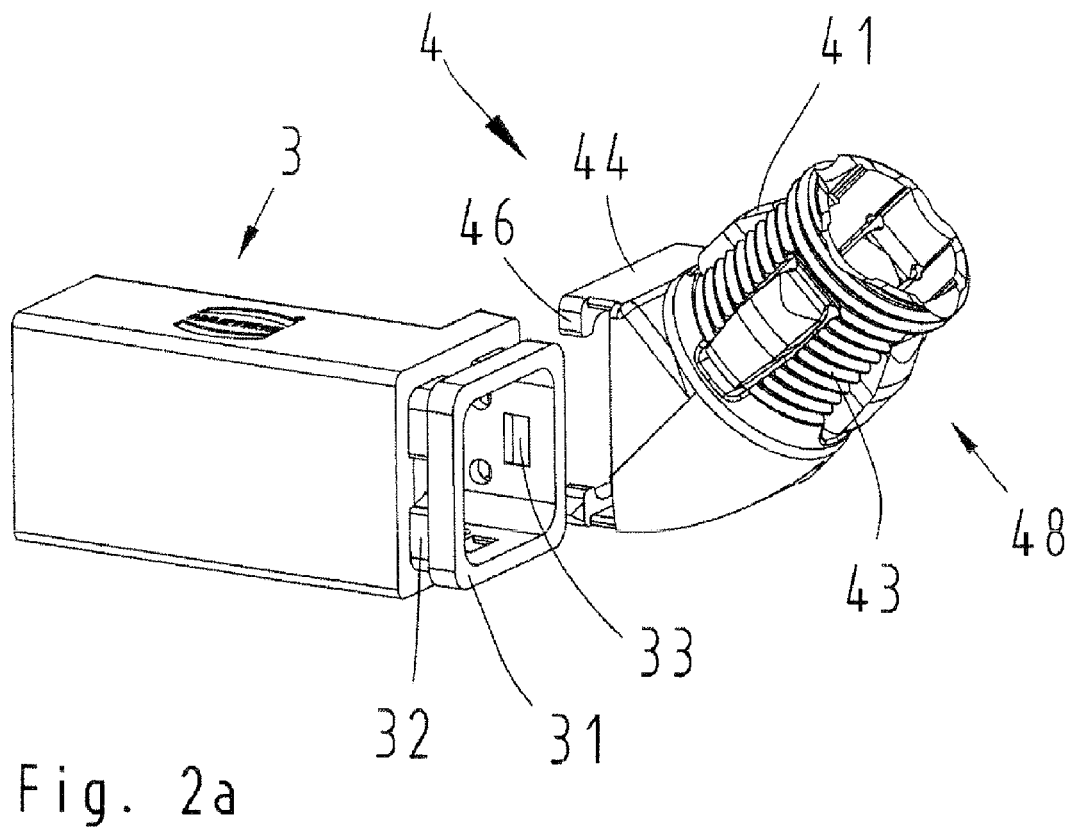
FIG. 2a shows a first view of an insulating body and a strain relief element.
Figure 2B:
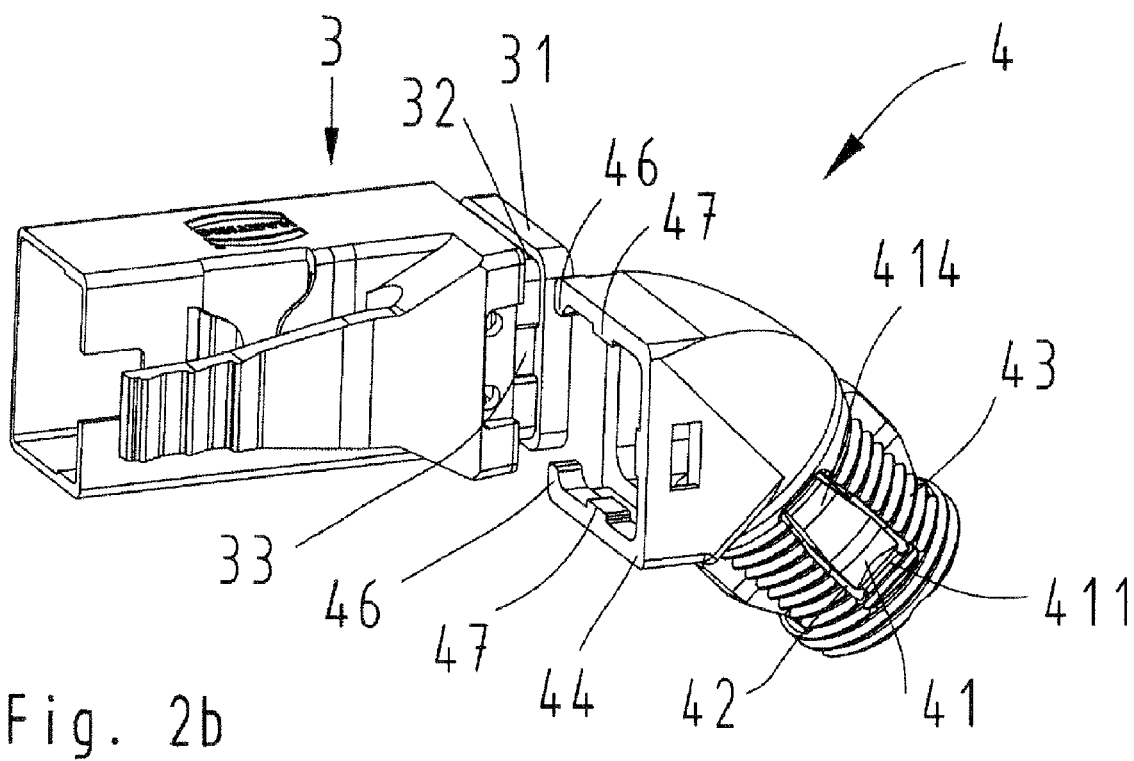
FIG. 2b shows a second view of an insulating body and a strain relief element.
Figure 3A:
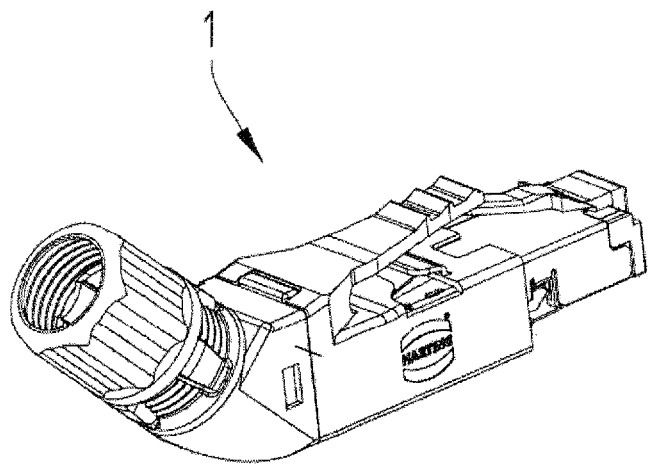
FIG. 3a shows an installed connector with a strain relief element fixed thereon in a first direction.
Figure 3B:
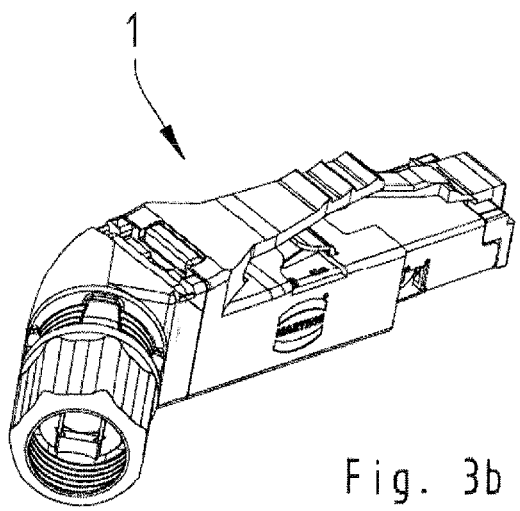
FIG. 3b shows an installed connector with a strain relief element fixed thereon in a second direction.
Figure 3C:
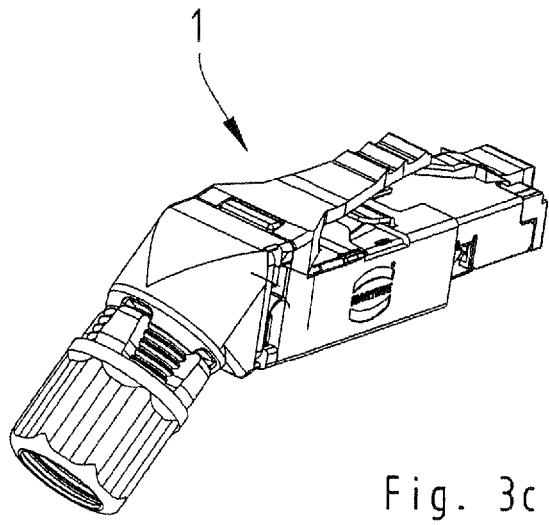
FIG. 3c shows an installed connector with a strain relief element fixed thereon in a third direction.
Figure 3D:
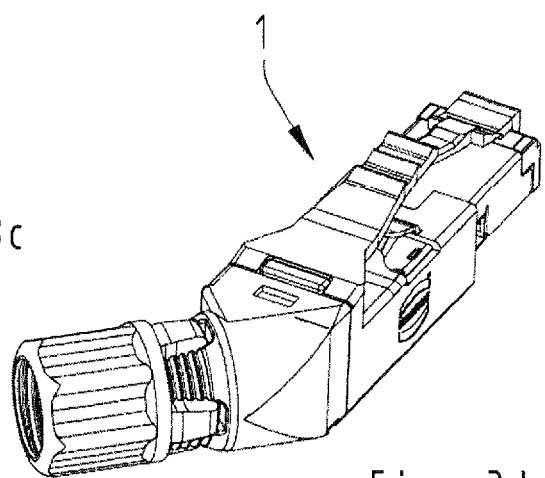
FIG. 3d shows an installed connector with a strain relief element fixed thereon in a fourth direction.

FIG. 2a and FIG. 2b show different views of an insulating body 3 and an angled strain relief element 4. One face side of the insulating body 3 features an opening that is surrounded by a square collar 31. This collar 31 features a peripheral recess 32. The square collar 31 furthermore features interlocking recesses 33 within this recess 32 on all four sides, wherein only one of these interlocking recesses is respectively illustrated in each figure in order to provide a better overview.

On one front side, the strain relief element 4 features a connection opening that is consistent with the opening of the insulating body 3 and provided with a rail 44 that surrounds this connection opening on three sides and its open toward the fourth side. This rail 44 accordingly extends in an essentially U-shaped fashion and respectively features an interlocking hook 46 on both of its ends. In addition, the U-shaped rail respectively features an interlocking tab 47 in the center of its two opposing sides.

When the rail 44 is inserted into the recess 32, the interlocking hooks 46 and interlocking tabs 47 initially deform. In the completely inserted state, the interlocking hooks 46 respectively engage behind the recess 32 and the interlocking tabs 47 engage into the respective interlocking recesses 33. The strain relief element 4 can be positively and non-positively fixed on the insulating body 3 in four different directions.

FIGS. 3a, 3b, 3c and 3d accordingly show an installed connector 1, in which the arrangement of the strain relief element 4 on the insulating body 3 is respectively turned by 90°.

As already indicated in FIG. 2a and FIG. 2b, the strain relief element 4 furthermore features a receptacle sleeve 48 with a thread 43 on a rear side that faces away from the front side in an angled fashion. Recesses 42 with clamping elements 41 arranged therein furthermore exist in the receptacle sleeve. These clamping elements 41 are clear on three sides and accordingly feature a free end 414 that points in the direction of the angling. Accordingly, the clamping element 41 is fixed on the receptacle sleeve 48 in the direction of an open end 482 of this receptacle sleeve 48 with a fixed end 411. The open end 482 of the receptacle sleeve 48 is provided for the insertion of an electric cable 8.

Figure 4A:
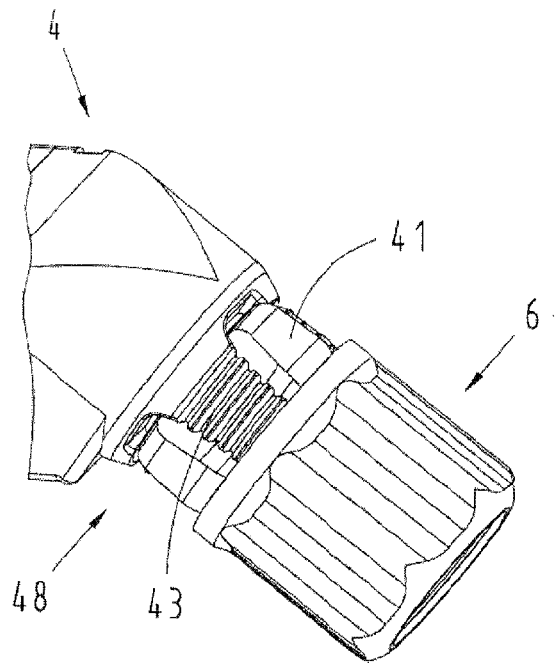
FIG. 4a shows a three-dimensional view of a strain relief element with a pressure screw partially screwed thereon.

FIG. 4a shows a strain relief element 4 with a corresponding receptacle sleeve 48, wherein a pressure screw 6 is partially screwed on the thread 43 of said receptacle sleeve.

The receptacle sleeve 48 is essentially realized cylindrically and serves for receiving an electric cable 8 to be inserted into the connector housing 1 and connected to contact elements of the connector insert 2. The pressure screw 6 can be screwed on the thread 43 of the receptacle sleeve 48. Recesses 42 with one respective clamping element 41 arranged therein are distributed over the circumference of the receptacle sleeve 48. In this case, these clamping elements 41 radially protrude over the circumference of the receptacle sleeve 48. As the pressure screw 6 is screwed on further, this pressure screw exerts a force upon the clamping elements 41 and presses the clamping elements 41 inward.

Figure 4B:
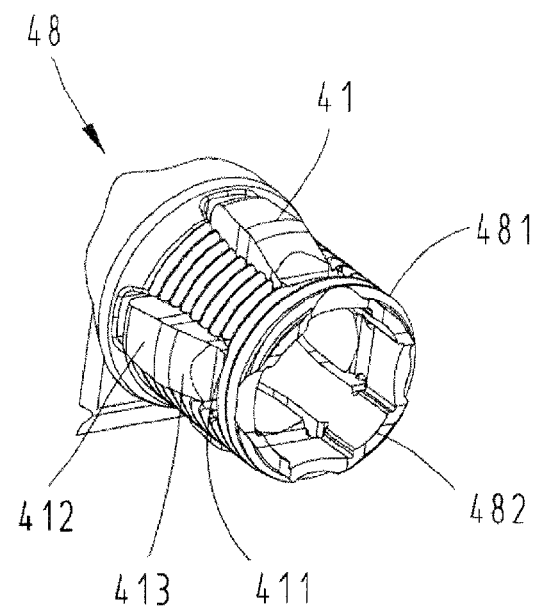
FIG. 4b shows a three-dimensional view of a strain relief element.

FIG. 4b shows the receptacle sleeve 48 with its open end 482. Four recesses 42 are uniformly distributed over the circumference of the receptacle sleeve. Each recess 42 is provided with a clamping element 41 that is clear on three sides and fixed in the direction of the open end 482 of the receptacle sleeve 48.

The clamping elements 41 feature a thickening 412 on their section that protrudes over the circumference 481 of the receptacle sleeve 48. The thickening 412 flattens toward the fixed end 411 and thusly forms an inclined surface 413, upon which the pressure screw 6 acts when it is screwed on.

Figure 4C:
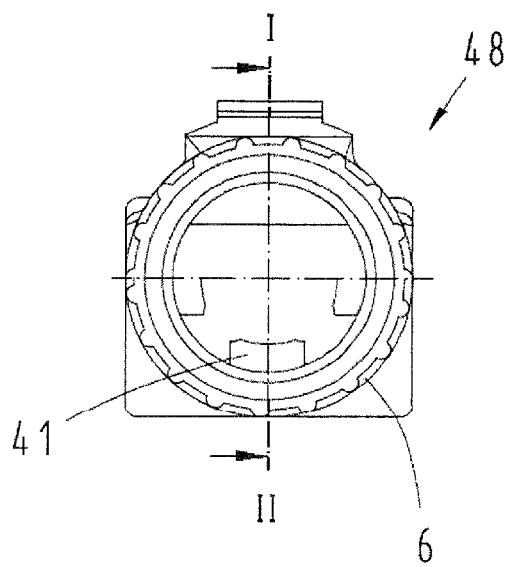
FIG. 4c shows a strain relief element in the form of a top view of the receptacle sleeve.

FIG. 4c shows a top view of the receptacle sleeve 48. In the initial state illustrated in this figure, the clamping elements 41 protrude into the inner region of the connector. The line of section I, II for FIG. 4d is also indicated in this figure.

Figure 4D:
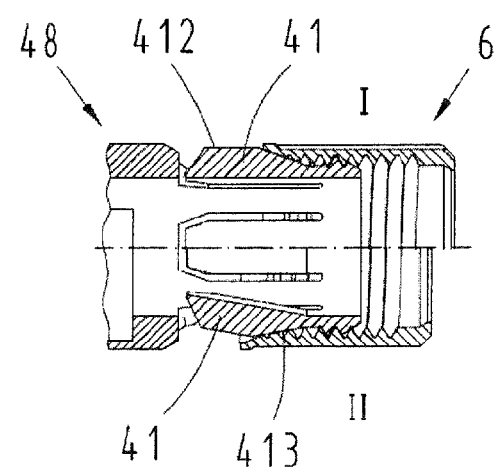
FIG. 4d shows a strain relief element with a pressure screw in the form of a longitudinal section.

FIG. 4d shows a connector housing 1 with a pressure screw 6 in the form of a section along the longitudinal axis, wherein the pressure screw 6 is only partially screwed on the receptacle sleeve 48 in the upper region and the pressure screw 6 is completely screwed on the receptacle sleeve 48 in the lower region. This figure shows how the pressure screw 6 contacts the inclined surface 413 of the clamping element 41 and exerts a force thereupon when it is screwed on. As the pressure screw is screwed on further, the free end 414 of the clamping element 41 moves radially inward and, if applicable, acts upon an electric cable 8 arranged in the receptacle sleeve 48.

What is claimed is:

1. A connector housing for clamping and curving an electric cable that is connected to a connector, wherein the connector housing consists of an insulating body and an angled strain relief element that can be separably fixed on the insulating body in different directions, and wherein the strain relief element features a receptacle sleeve that is provided with a thread and a pressure screw, wherein a face side of the insulating body features an opening that is surrounded by a square collar, wherein the collar features a peripheral recess, in that a front side of the strain relief element features a connection opening that is consistent with the opening of the insulating body, as well as a rail that surrounds the connection opening on three sides and is open toward the fourth side, wherein the rail can be inserted into the peripheral recesses of the collar in a form-fitting fashion on its open side, and in that the receptacle sleeve is arranged on a rear side of the strain relief element that faces away from the front side in an angled fashion and features at least one recess with a clamping element that is clear on three sides arranged therein.

2. The connector housing according to claim 1, wherein interlocking recesses are provided on the peripheral recess, and in that interlocking tabs that fit into these interlocking recesses in a form-fitting fashion are moulded onto the rail.

3. The connector housing according to claim 2, wherein the interlocking tabs are arranged on two opposing sides of the rail.

4. The connector housing according to claim 1, characterized in that the rail has two ends, onto which one interlocking hook is respectively moulded.

5. The connector housing according to claim 1, wherein the clamping element that is clear on three sides has a free end that points in the direction of the angling of the strain relief element.

6. The connector housing according to claim 1, wherein the receptacle sleeve has an open end on its side that faces away from the connection opening, wherein this open end is suitable for inserting the electric cable.

7. The connector housing according to claim 6, wherein the clamping element that is clear on three sides is fixed on the receptacle sleeve in the direction of the open end thereof.

8. The connector housing according to claim 1, characterized in that the clamping element features a thickening on its surface that points radially outward, wherein said thickening forms a flattening, inclined surface toward a fixed end of the clamping element and therefore is suitable for pressing the clamping element radially inward by screwing the pressure screw on the receptacle sleeve.

9. The connector housing according to claim 8, wherein the thickening of the clamping element radially protrudes over the circumference of the receptacle sleeve.

10. The connector housing according to claim 1, wherein the clamping element has the shape of a wedge in order to fix the electric cable.

11. The connector housing according to claim 2, wherein the clamping element has the shape of a wedge in order to fix the electric cable.

12. The connector housing according to claim 3, wherein the clamping element has the shape of a wedge in order to fix the electric cable.

13. The connector housing according to claim 4, wherein the clamping element has the shape of a wedge in order to fix the electric cable.

14. The connector housing according to claim 5, wherein the clamping element has the shape of a wedge in order to fix the electric cable.

15. The connector housing according to claim 6, wherein the clamping element has the shape of a wedge in order to fix the electric cable.

16. The connector housing according to claim 7, wherein the clamping element has the shape of a wedge in order to fix the electric cable.

17. The connector housing according to claim 8, wherein the clamping element has the shape of a wedge in order to fix the electric cable.

18. The connector housing according to claim 9, wherein the clamping element has the shape of a wedge in order to fix the electric cable.

* * * * *